United States Patent [19]

McAllister et al.

[11] 4,293,827

[45] Oct. 6, 1981

[54] MULTIWAVELENGTH DYE LASER

[75] Inventors: Gary L. McAllister; V. G. Draggoo, both of Richland, Wash.

[73] Assignee: Jersey Nuclear-Avco Isotopes, Inc., Bellevue, Wash.

[21] Appl. No.: 75,402

[22] Filed: Sep. 14, 1979

[51] Int. Cl.[3] .............................................. H01S 3/082
[52] U.S. Cl. ..................... 331/94.5 ML; 331/94.5 L; 331/94.5 C; 331/94.5 D
[58] Field of Search .................. 331/94.5 ML, 94.5 S, 331/94.5 C; 455/609, 611; 350/169, 174

[56] References Cited

U.S. PATENT DOCUMENTS

| | | | |
|---|---|---|---|
| Re. 29,670 | 6/1978 | Spaulding | 350/174 |
| 2,780,130 | 2/1957 | Mauer | |
| 3,577,093 | 6/1971 | Simpson | 331/94.5 |
| 3,621,459 | 11/1971 | Reeves | 331/94.5 C |
| 3,715,685 | 2/1973 | Gordon et al. | 331/94.5 C |
| 3,743,383 | 7/1973 | Giallorenzi | 350/174 |
| 3,753,148 | 8/1973 | Billman | 331/94.5 |
| 3,969,686 | 8/1976 | Scifres et al. | 331/94.5 H |
| 3,970,963 | 7/1976 | Chester | 331/94.5 C |

*Primary Examiner*—William L. Sikes
*Assistant Examiner*—Léon Scott, Jr.
*Attorney, Agent, or Firm*—Weingarten, Maxham & Schurgin

[57] ABSTRACT

The problems of collimating, synchronizing and combining a plurality of laser beams to generate a composite beam are substantially reduced by the use of one or more lasers especially adapted to lase in two or more separate wavelengths. Specifically, a composite beam generating system comprises at least one multiwavelength laser for emitting a multiwavelength beam having at least two separated wavelength components, one or more additional lasers for generating respective additional beams, and means for combining the multiwavelength beam with one or more additional beams. In a preferred embodiment, a four-component multiwavelength composite beam is generated by polarization combination of the outputs of a pair of orthogonally polarized two-component multiwavelength lasers. The preferred embodiment of a multiwavelength laser is a liquid dye laser having, as one of the reflecting means defining the resonant cavity, an optical reflector having a reflectivity versus wavelength characteristic with a local minimum of reflectivity between two regions of substantially greater reflectivity.

14 Claims, 5 Drawing Figures

MULTIWAVELENGTH DYE LASER

FIELD OF THE INVENTION

The present invention relates to laser optics and, in particular, to an optical system for generating a multiwavelength composite beam.

BACKGROUND OF THE INVENTION

Composite laser beams are substantially colinear light beams respectively containing light beams from a plurality of separate lasers, each laser emitting its own relatively narrow band of wavelengths. Typically each of the constituent lasers emits a different wavelength. Accordingly the resulting composite beam can be referred to as a multiwavelength composite laser beam.

Multiwavelength composite laser beams are particularly useful in laser isotope separation. With appropriate choice of wavelengths, a multiwavelength composite beam shone through an isotopic mixture can effect isotopically selective, multiple-step excitation or even photoionization. Typically the composite beam includes at least one narrow band wavelength component for selectively exciting atoms or molecules comprising the desired isotope and a plurality of additional wavelength components for further exciting the atoms or molecules to even higher states. The selectively excited components of the mixture are then separated from the nonexcited components by electrical, electromagnetic, chemical or mechanical means. See, for example, U.S. Pat. No. 3,443,087 issued to Jean Roieux et al; U.S. Pat. No. 3,772,519 issued to Richard Levy et al; British Pat. No. 1,284,620 issued to Karl Gurs; and U.S. Pat. No. 3,996,470 issued to James Keck.

For efficiency in isotope separation, the optical system used in generating the multiwavelength composite laser beam must meet a number of stringent requirements. First, such systems should contain a minimum number of lossy components. Typically they require high intensity laser beams to effect the desired separation. Lossy components, such as dichroic elements, greatly restrict the level of deliverable intensity. Second, such systems should produce a composite beam having a high degree of colinearity among its constituent components. This requirement arises because the different wavelength components must act on the isotopic mixture substantially simultaneously and because extremely long paths, typically folded, are required to fully utilize the laser output. Third, such systems should be capable of a high degree of synchronism. As previously indicated high power lasers capable of acting together are needed. In typical applications pulsed lasers are used and care must be taken to ensure that they pulse in synchronism.

Prior art arrangements for producing high power, composite laser beams typically comprise a plurality of high power lasers, one for each desired wavelength, and a beam combining system comprised of dichroic elements, rotating optics or beam splitters. See, for example, U.S. Pat. No. 3,521,068 issued to Armstrong et al. Such systems are less than satisfactory for isotope separation because they typically utilize lossy components and because of the difficulties in accurately collimating and synchronizing so many different lasers.

SUMMARY OF THE INVENTION

In accordance with the present invention, the problems of collimating, synchronizing and combining a plurality of laser beams to generate a composite beam are substantially reduced by the use of one or more lasers especially adapted to lase in two or more separate wavelengths. Specifically, a composite beam generating system in accordance with the invention comprises at least one multiwavelength laser for emitting a multiwavelength beam having at least two separated wavelength components, one or more additional lasers for generating respective additional beams, and means for combining the multiwavelength beam with one or more additional beams. In a preferred embodiment, a four-component multiwavelength composite beam is generated by polarization combination of the outputs of a pair of orthogonally polarized two-component multiwavelength lasers. The preferred embodiment of a multiwavelength laser is a liquid dye laser having, as one of the reflecting means defining the resonant cavity, an optical reflector having a reflectivity versus wavelength characteristic with a local minimum of reflectivity between two regions of substantially greater reflectivity.

BRIEF DESCRIPTION OF THE DRAWINGS

The nature, advantages and various features of the invention will appear more fully upon consideration of the illustrative embodiments now to be described in detail in connection with the accompanying drawings.

In the drawings.

DETAILED DESCRIPTION OF THE INVENTION

Figure 1:
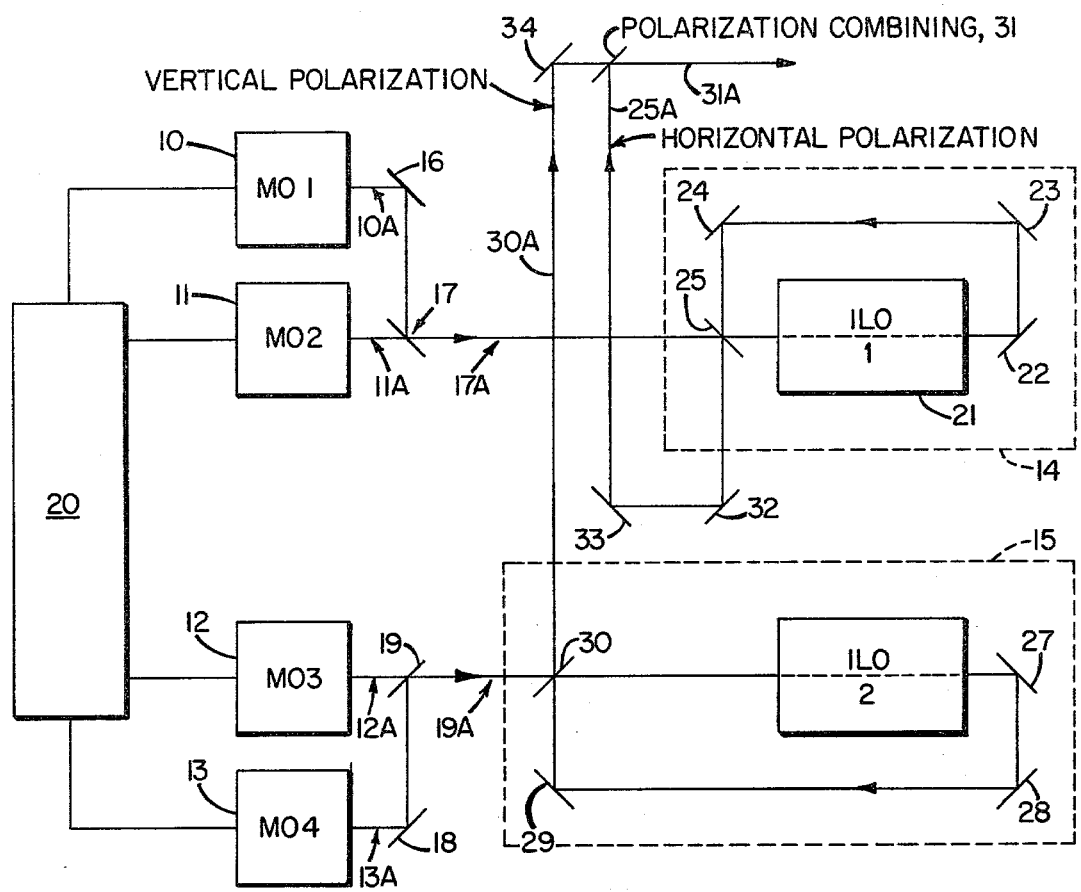
FIG. 1 is a schematic diagram of a preferred multiwavelength composite beam generating system in accordance with the invention.

Referring to the drawings, FIG. 1 is a schematic diagram of a preferred multiwavelength composite beam generating system in accordance with the invention comprising a plurality (here four) of master oscillator lasers 10, 11, 12, and 13 and one or more multiwavelength lasers 14 and 15 preferably configured in an injection locked oscillator configuration. Combining elements in the form of mirror 16 and dichroic mirror 17 are provided for combining the beams 10A and 11A from master oscillators 10 and 11, repectively, and feeding the combined beam 17A into multiwavelength laser 14. Similarly, combining elements in the form of mirror 18 and dichroic mirror 19 combine beams 12A and 13A into beam 19A and feed it into multiwavelength laser 15. The master oscillators 10, 11, 12 and 13 are preferably tunable lasers, such as liquid dye lasers, capable of generating at low intensity, respective single component light beams having a relatively narrow range of wavelengths on the order of a few hundredths of an angstrom in spectral width. In typical applications, each of lasers 10, 11, 12 and 13 will be emitting at different wavelengths, which can be designated $\lambda_{10}$, $\lambda_{11}$, $\lambda_{12}$ and $\lambda_{13}$, respectively. In the cases where specifically timed pulse lasing is desired, timing means 20, such as a pulse synchronization circuit, is appropriately coupled to the master oscillators 10, 11, 12 and 13 in accordance with techniques well known in the art.

The multiwavelength lasers 14 and 15 are lasers especially adapted for emitting a single multi-component beam comprising wavelength components of the beams fed into them. In the preferred embodiment, the multiwavelength laser 14 comprises a liquid dye lasing medium 21 and an optical resonant cavity such as the loop defined by reflecting means 22, 23, 24 and coupling reflector 25. Multiwavelength lasing at a plurality of substantially separated spectral regions of wavelength is obtained by utilizing, as one of the reflecting means defining the resonant cavity, a reflecting means having a reflectivity versus wavelength characteristic of the type generally shown in FIG. 2A. Specifically, at least one of the reflecting means defining the cavity—preferably the coupling reflector 25—has a reflectivity versus wavelength characteristic with a local minimum of reflectivity between two regions of substantially greater reflectivity. Mirrors having such reflecting characteristics are commerically available from CVI Laser Corp., P.O. Box 11308, Albuquerque, NM 87112. Alternatively, directions for making such a reflecting means are to be found in H. A. Macleod, *Thin Film Optical Filters*, (American Elsevier, N.Y. 1969) which is incorporated herein by reference.

As a specific example, a multiwavelength laser was constructed using such a reflector in conjuction with a Rh6G dye laser in a 70/30 water/methanol solution. Output bands having a bandwidth of approximately ten angstroms and approximately equal intensities were observed centered at 5910 angstroms and 6080 angstroms. When two pulsed master oscillator beams with wavelengths of 5913 angstroms and 6085 angstroms were injected into the multiwavelength laser in an injection locking configuration, narrow band outputs were obtained centered at the injected wavelengths and having bandwidths of less than about an angstrom.

Multiwavelength laser 15 is of similar construction with a dye lasing medium 26 and a loop cavity defined by reflecting means 27, 28, 29 and coupling reflector 30. One of these reflectors has a reflectivity versus wavelength characteristic of the same general shape as that shown in FIG. 2A.

Figure 2A:
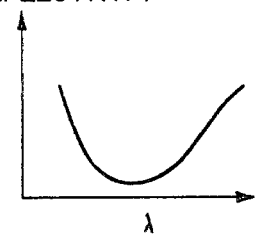
FIGS. 2A, 2B, 2C and 2D are graphical illustrations useful in understanding the operation of the multiwavelength laser of FIG. 1.
Figure 2B:
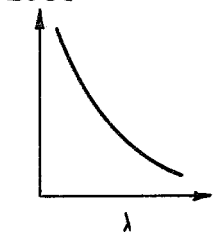
Figure 2C:
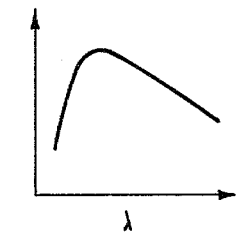
Figure 2D:
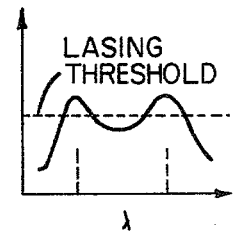

The operation of these multiwavelength lasers may be understood by reference to FIGS. 2(B), 2(C) and 2(D) which illustrate, for a dye laser, typical characteristic curves for dye loss, dye gain and net gain, respectively as a function of wavelength. When the reflectivity characteristic of FIG. 2(A) is combined with the dye loss and dye gain characteristics of FIGS. 2(B) and 2(C), a net gain characteristic similar to that of FIG. 2(D) can be achieved. Specifically, the reflector can produce net gain local maxima above the threshold for lasing at a plurality of separated wavelengths. Thus by constructing or selecting reflector 24 to have the proper reflectivity characteristic, the net gain maxima for laser 14 can be made to fall near $\lambda_{10}$ and $\lambda_{11}$, and the multiwavelength laser will lock onto these wavelengths of the injected beams 10A and 11A to produce an output beam 14A having wavelength components $\lambda_{10}$ and $\lambda_{11}$. Similarly laser 15, by proper choice or selection of reflector 30, will lock onto the wavelengths in its input beams 12A and 13A to produce an output beam 15A having corresponding wavelength components $\lambda_{12}$ and $\lambda_{13}$.

The two output beams from the two multiwavelength lasers 14 and 15 can be combined much more readily and more efficiently than can four beams of corresponding component intensity from four separate lasers. In the preferred combination system, the lasers are adapted, as by Brewster angle prisms, to emit linearly polarized beams, and the polarized beams are combined by projecting them with mutually orthogonal polarization orientations on opposite sides of a polarization combining element 31, which will totally reflect light polarized in one direction, e.g. horizontally, and transmit light polarized in the other orthogonal direction, e.g. vertically. Beam directing means, such as mirrors 32, 33 and 34 are used to direct the beams onto element 31. A polarization combiner suitable for this application is described in Jenkins & White, *Fundamentals of Optics*, Chapter 25, (McGraw Hill, 3rd. Ed. 1957), which is incorporated herein by reference.

In the polarization combining element 31, the two beams are efficiently combined into a highly colinear composite output beam 31A which has wavelength components $\lambda_{10}$, $\lambda_{11}$, $\lambda_{12}$ and $\lambda_{13}$. Problems of precision alignment and synchronization are substantially reduced because the user need align and synchronize only two high power beams rather than four.

In addition, this composite beam generating system is highly efficient in that it is particularly economical of the energy required to reach threshold in the high power lasers. In a conventional system using four lasers, threshold energy is wasted for four high power lasers whereas in the invention threshold energy is required for only two.

While it is believed clear from the foregoing description, it should be expressly noted a wavelength component, as used herein, encompasses not only the mid-band wavelength of a typical laser emission but also the slightly different wavelengths associated with the different related longitudinal and transverse modes. As the separations between modal wavelengths are very small, the emission can properly be regarded as monochromatic in a single wavelength component. Similarly, by reference to separated wavelength components, this specification and the appended claims refer to separate wavelength components which are separated in wavelength substantially wider than the longitudinal and transverse mode separations commonly found within a wavelength component. Typically, different modal wavelengths are separated by approximately one thousandth of an angstrom whereas the separate wavelength components of a multiwavelength laser in accordance with the invention are separated in excess of about 5 angstroms, and typically 25–50 angstroms.

While the invention has been described in connection with a small number of specific embodiments, it is to be understood that these are merely illustrative of the many other specific embodiments which can also utilize the principles of the invention. For example, while the preferred embodiment illustrated utilized two multiwavelength lasers, it is clear that any number of such lasers, from one to several can be used in the generation of a multiwavelength beam with a corresponding reduction in the number of lasers required to generate the beam and a resulting simplication of the combining structure. Furthermore while the multiwavelength beam generating system disclosed herein utilizes a novel multiwavelength laser, other types of multiwavelength lasers can be substituted therefor. Thus numerous and varied devices can be made by those skilled in the art without departing from the spirit and scope of the present invention.

What is claimed is:

1. A laser beam generating system for generating a composite laser beam comprised of at least two separate laser beams and having at least two separate wavelength components, said system comprising:

at least one multiwavelength laser for emitting a first multiwavelength laser beam having at least two separated wavelength components;

at least one additional laser for emitting a second laser beam;

means for polarizing said first and second laser beams;

means for directing the polarized beams onto polarization combining means; and polarization combining means for receiving said polarized beams and combining them into a substantially colinear composite beam.

2. A laser beam generating system for generating a composite laser beam comprised of at least two separate laser beams and having at least two separate wavelength components, said system comprising:

a first multiwavelength laser for emitting a first multiwavelength laser beam having at least two separated wavelength components;

at least a second multiwavelength laser for emitting a second multiwavelength laser beam having at least two separated wavelength components; and means for combining said first and second multiwavelength laser beams into a substantially colinear composite beam.

3. A laser beam generating system according to claim 1 or 2 wherein said at least one multiwavelength laser comprises an active lasing medium optically coupled to a resonant cavity defined by a plurality of reflecting means and at least one of said reflecting means has a reflectivity versus wavelength characteristic having a local minimum sufficiently low to prevent lasing surrounded by higher levels of reflectivity at greater and lesser wavelengths which are sufficiently high to permit lasing at respective separated wavelengths.

4. A laser beam generating system according to claim 2 wherein at least two separate wavelength components of said second multiwavelength laser are each different from the wavelength components of said first multiwavelength laser.

5. A laser beam generating system according to claim 1 or 2 wherein at least one of said laser is an injection locked laser responsive to at least one master oscillator laser.

6. A laser beam generating system according to claim 1 wherein at least one of said multiwavelength lasers is an injection locked laser responsive to a plurality of master oscillator lasers.

7. A laser beam generating system according to claim 2 wherein the first and second multiwavelength lasers are injection locked lasers each responsive to a plurality of master oscillators.

8. In a multiwavelength laser of the type comprising an active lasing medium, an optical resonant cavity comprising a plurality of reflecting means optically coupled to said lasing medium; means for exciting said medium to lasing; and means for extracting optical energy from said cavity, the improvement wherein:

at least one of said reflecting means has a reflectivity versus wavelength characteristic having a local minimum sufficiently low to prevent lasing surrounded by higher levels of reflectivity at greater and lesser wavelengths which are sufficiently high to permit lasing at respective separated wavelengths.

9. A multiwavelength laser according to claim 8 wherein said laser is a liquid dye laser.

10. A multiwavelength laser system comprising:

the multiwavelength laser of claims 8 and 9 and disposed in an injection locking configuration; and a plurality of master oscillator lasers for injecting a respectively plurality of laser beams into said multiwavelength laser for locking said multiwavelength laser to an output beam having a plurality of wavelength components substantially equal to the wavelengths of said master oscillator beams.

11. A laser system according to claim 1, 2, 4, or 7 wherein said separated wavelength components of each said multiwavelength laser are separated in wavelength in excess of about 5 angstroms.

12. A laser system according to claim 1, 2, 4, 6, or 7 wherein said separated wavelength components of each said multiwavelength laser are separated in wavelength by about twenty-five to fifty angstroms.

13. A laser apparatus according to claim 8 or 9 wherein said separated wavelength components of each said multiwavelength laser are separated in wavelength in excess of about five angstroms.

14. A laser beam generating system for generating a composite laser beam comprised of at least two separate laser beams and having at least two separate wavelength components, said system comprising:

a first multiwavelength laser for emitting a multiwavelength laser beam having at least two separated wavelength components, said laser comprising an active lasing medium optically coupled to a resonant cavity defined by a plurality of reflecting means wherein at least one of said reflecting means has a reflectivity versus wavelength characteristic having a local minimum sufficiently low to prevent lasing surrounded by higher levels of reflectivity at greater and lesser wavelengths which are sufficiently high to permit lasing at respective separated wavelengths;

at least one additional laser for emitting a second laser beam; and means for combining said multiwavelength laser beam and said second laser beam into a substantially colinear beam.

* * * * *